(12) United States Patent
Sarkar et al.

(10) Patent No.: US 7,171,061 B2
(45) Date of Patent: Jan. 30, 2007

(54) SYSTEMS AND METHODS FOR TRIAGE OF PASSAGES OF TEXT OUTPUT FROM AN OCR SYSTEM

(75) Inventors: Prateek Sarkar, Sunnyvale, CA (US);
Henry S. Baird, Palo Alto, CA (US);
John R. Henderson, Mitcheldean (GB)

(73) Assignee: Xerox Corporation, Stamford, CT (US)

( * ) Notice: Subject to any disclaimer, the term of this patent is extended or adjusted under 35 U.S.C. 154(b) by 766 days.

(21) Appl. No.: 10/064,435

(22) Filed: Jul. 12, 2002

(65) Prior Publication Data
US 2004/0010758 A1    Jan. 15, 2004

(51) Int. Cl.
G06K 9/03    (2006.01)
(52) U.S. Cl. ...................................... 382/309
(58) Field of Classification Search ................ 715/531, 715/529; 382/309
See application file for complete search history.

(56) References Cited

U.S. PATENT DOCUMENTS

| | | | |
|---|---|---|---|
| 4,773,099 A * | 9/1988 | Bokser | 382/225 |
| 5,057,936 A * | 10/1991 | Bares | 358/405 |
| 5,465,353 A * | 11/1995 | Hull et al. | 707/5 |
| 5,805,747 A | 9/1998 | Bradford | |
| 6,269,188 B1 * | 7/2001 | Jamali | 382/229 |
| 2002/0103834 A1 * | 8/2002 | Thompson et al. | 707/526 |

OTHER PUBLICATIONS

Abstract of Triage of OCR Results Using 'Confidence' Scores, Prateek Sarkar; et al., SPIE—Document Recognition and Retrieval IX, Jan. 21-22, 2002, pp. 216-222.

* cited by examiner

Primary Examiner—Joseph Mancuso
Assistant Examiner—Jonathan Schaffer
(74) Attorney, Agent, or Firm—Oliff & Berridge, PLC; Eugene Palazzo

(57) ABSTRACT

Systems and methods for triage of passages of text output from an OCR system by use of trainable models of the accuracy of the OCR system based on attributes of individual characters. The systems and methods according to this invention automatically triage an OCR-output text passage by determining at least one OCR-output character attribute for each OCR-output character, determining an error rate for the OCR-output text passage using a triage model and the determined at least one OCR-output character attribute, and comparing the determined error rate for the OCR-output text passage with an OCR-output text passage threshold error rate to perform an OCR-output text passage triage decision. Triage decision includes for example, sending OCR results directly to an end user without any post-OCR processing, sending the OCR results through a post-OCR inspection and processing stage, sending the original document image to be completely keyed in manually, and a combination thereof.

31 Claims, 10 Drawing Sheets

SYSTEMS AND METHODS FOR TRIAGE OF PASSAGES OF TEXT OUTPUT FROM AN OCR SYSTEM

BACKGROUND OF THE INVENTION

1. Field of Invention

This invention generally relates to processing text passages that are subjected to character recognition processes.

2. Description of Related Art

Digitizing paper documents generally involves creating a bitmap image of the paper document using a scanner or similar device and then storing the bitmap image in a computer system. To retrieve and evaluate bitmap images, the computer must recognize characters within the bitmap image created by the scanner. Character recognition techniques, for example, optical character recognition (OCR) techniques, are generally used to convert images of characters, usually provided to the computer system in some standard format, such as, for example, the tagged image file format (TIFF), into machine-legible coded form of those characters, such as, for example, ASCII or Unicode.

In carrying out this conventional conversion process, some fraction of the characters may not be converted correctly. Some basic OCR errors include, for example: substitution, where one character in a text passage is mistaken for another; deletion, where the correct character is missing; and insertion, where a spurious character is introduced. Often times, post-OCR correction of the document image must be performed in order to maintain acceptable document content accuracy.

SUMMARY OF THE INVENTION

The cost of conversion of paper documents, through image acquisition, for example, scanning, and recognition, for example, OCR, into machine-legible coded form, such as, for example, ASCII or Unicode, is often dominated by the expense of post-OCR correction. At times, post-OCR correction, which may have to be performed manually, can require rekeying of the entire document, thus obviating every advantage of OCR. This occurs because the present state of the art of OCR can only rarely yield uniformly high accuracies across collections of dissimilar documents, for example, those containing a variety of typefaces, languages, layout formats, and/or image qualities.

This invention provides systems and methods for automatic triage of text passages outputted from a character recognition system, for example, an OCR system, using trainable models of the accuracy of the system that are based on attributes of the individual characters of each text passage. To triage is to decide what resources will be used to improve, for example heal or fix, something. In various exemplary embodiments according to this invention, triage means the decision procedure for making a triage decision, and the effects of that decision on later processing. In this invention, the item to be improved, on which triage decisions are made, are the results of running optical recognition processes (OCR) on images of documents containing passages of text. Thus, triage is the process of rapidly and automatically estimating the quality of OCR to enable procedural decisions later in the scanning and recognition pipeline or process.

This invention provides systems and methods for automatic triage of OCR-outputted text passages to determine the best post-OCR processing step required for the text passages evaluated. In various exemplary embodiments, post-OCR processing steps may include, for example, sending the OCR-output text passage directly to the end user without any post-OCR processing, such as, for example, rekeying and/or correction of text passage. In alternate exemplary embodiments, post-OCR processing steps may include, for example, sending the OCR-output text passage through a post-OCR inspection and correction stage. In various alternate exemplary embodiments, post-OCR processing steps may include, sending the original text passage image to be completely keyed in manually. In various alternate exemplary embodiments, post-OCR processing steps may include a combination of inspection, correction and manual rekeying steps.

This invention provides systems and methods for applying OCR text triage tools fully automatically and at high speed in a "scan-and-convert" document service center setting to improve accuracy, speed throughput, raise productivity, improve quality assurance, lower production costs, and provide management with a real-time decision tool for selecting best operating practices.

In various exemplary embodiments, the systems and methods according to this invention determine the accuracy of an OCR-outputted document text passage.

In various exemplary embodiments, the systems and methods according to this invention automatically triage an OCR-output text passage by determining at least one OCR-output character attribute for each character within the OCR-output text passage, determining an error rate for the OCR-output text passage using a triage model and the determined at least one OCR-output character attribute, and comparing the determined error rate for the OCR-output text passage with an OCR-output text passage threshold error rate to perform an OCR-output text passage triage decision.

In various exemplary embodiments, the systems and methods according to this invention automatically triage OCR-output text passages that include at least one of pages, characters, words, phrases, text-lines, sentences, paragraphs, columns of text, blocks of text, text articles, multi-page documents, collections of single-page documents, collections of multi-page documents, and the like.

BRIEF DESCRIPTION OF THE DRAWINGS

Various exemplary embodiments of the systems and methods of this invention will be described in detail below, with reference to the following figures, in which.

DETAILED DESCRIPTION OF THE METHODS

Converting paper documents into a machine-legible coded format produces OCR-outputted documents having various degrees of accuracy across collections of dissimilar documents. Existing systems and methods for identifying the accuracy of OCR-outputted documents on the basis of, for example, confidence values for text characters recognized, or spell-checking a document, are unsophisticated, time consuming and labor intensive.

Automatically deciding which of the documents emerging from the OCR process possess acceptable accuracy could allow these documents to skip manual correction, lowering production costs. Furthermore, automatically identifying OCR-outputted documents having extremely low accuracy rate values would allow the documents to be completely rekeyed, which could also lower production costs since it eliminates the tedious step associated with manually verifying the OCR-outputted text. We call this a 'triage' decision, in analogy with the practice of emergency medical rescue staff who are trained to classify injured individuals into those who need immediate medical attention and those who do not. Medical triage tries to maximize the number of survivors given finite care facilities. OCR triage tries to maximize the number of pages that skip correction given a fixed uniform accuracy target.

The systems and methods of this invention enable scan-and-convert businesses and alike to determine the accuracy of an OCR-outputted document text passage and then to automatically decide the best post-OCR processing step required for that particular text passage. Post-OCR processing steps may include, for example, sending the OCR text passage directly to the end user without any post-OCR rekeying or correction, sending the OCR text passage through a post-OCR inspection and correction stage, sending the original text passage image to be completely keyed in manually, or a combination thereof.

Figure 1:
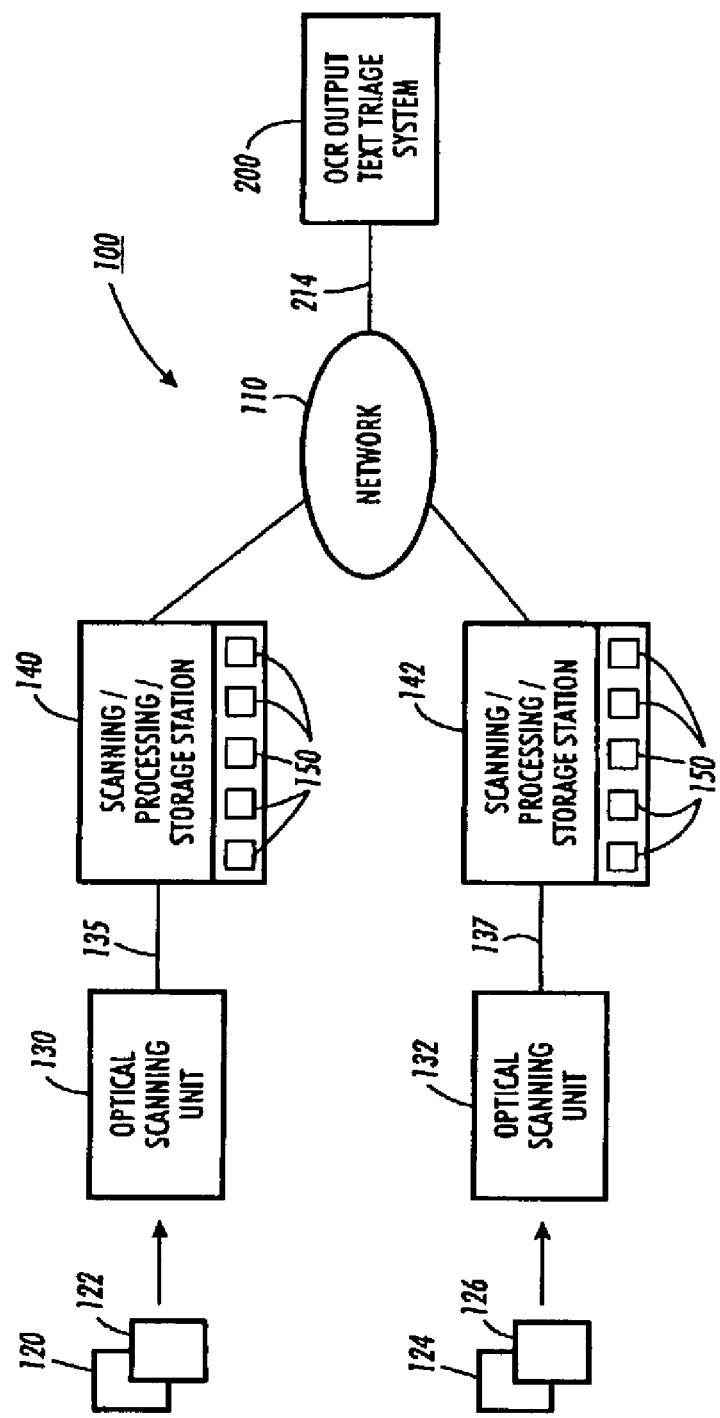
FIG. 1 illustrates a high level document scan-and-convert network environment.

FIG. 1 shows one exemplary embodiment of a network environment 100 that the systems and methods of this invention are usable with. As shown in FIG. 1, in the scan-and-convert network environment 110, hard-copy documents, such as, for example, document pages 120, 122, 124 and 126, are scanned into one or more document scanning units, for example, optical scanning units 130, 132. Hard-copy documents 120, 122, 124 and 126 typically include images representing alphanumeric characters. The optical scanning units 130 and 132 scan the hard-copy documents 120, 122, 124 and 126 and produce electronic signals corresponding to a digital page image representing the image of hard-copy documents 120, 122, 124 and 126. One or more scanning/processing/storage stations 140 and 142, such as, for example OCR scanning/processing/storage stations 140 and 142, are provided to receive the digital page image, perform any necessary or desired character recognition functions, and store the OCR-outputted documents or text passages 150. The OCR scanning/processing/storage stations 140 and 142 may be connected to the optical scanning units 130 and 132 via links 135 and 137, respectively, or through other connections present within network 110.

A user, using a personal computer or other device that is equipped with a suitable communications software, can access the network 110 over a communication link 214 and is able to access the OCR-outputted documents or text passages 150 available on the network 110. The network 110 includes, but is not limited to, for example, local area networks, wide area networks, storage area networks, intranets, extranets, the Internet, or any other type of distributed network, each of which can include wired and/or wireless portions.

Figure 3:
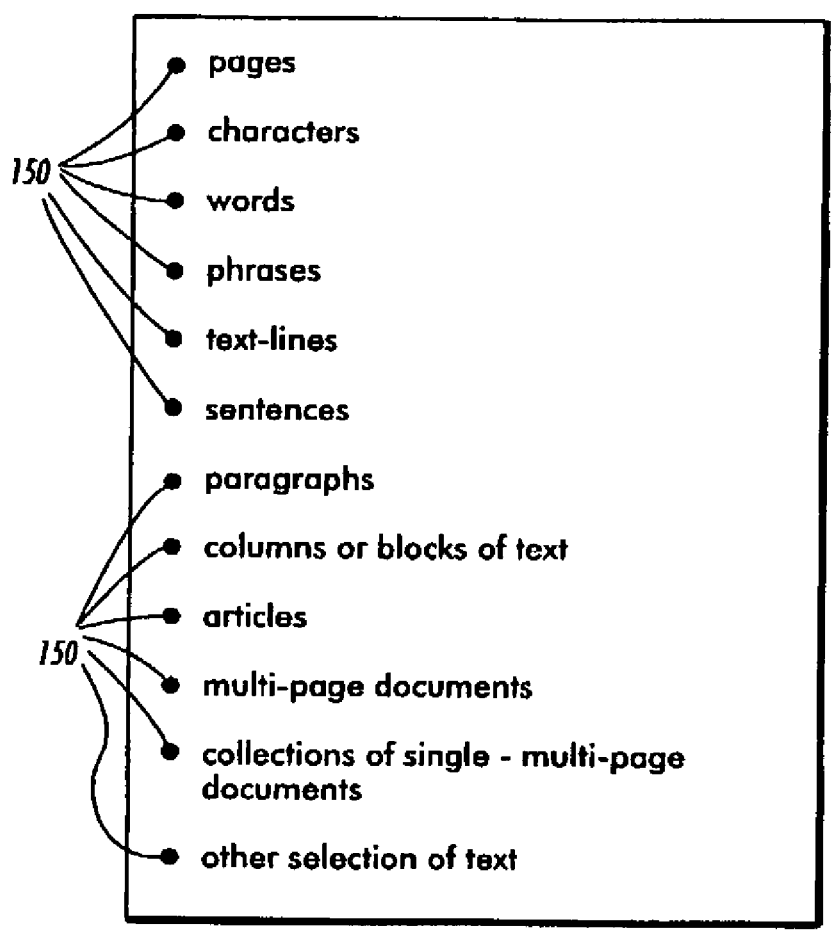
FIG. 3 provides examples of the types of OCR-output text passages that can be evaluated according to this invention.

The large volume of OCR-outputted documents or text passages 150 available on the scan-and-convert network 110 presents significant difficulties to a user in manually determining which of the text passages 150 meet the text passage error threshold values imposed by the customer for the group of scanned documents. In various exemplary embodiments, a network or web-connected OCR output text triage system 200 according to this invention allows the text passages 150 to be automatically triaged in an accurate and efficient manner such that the number of pages or text passages that skip correction, given a fixed uniform accuracy target, is maximized. The text passages 150, as shown in FIG. 3, to which the systems and methods of this invention are applied include, for example, entire pages, individual text characters contained within a page, words, phrases, text-lines, sentences, paragraphs, columns of text, blocks of text, text articles, multi-page documents, collections of single-page documents, collections of multi-page documents, and the like.

As shown in FIG. 1, in various exemplary embodiments, the OCR output text triage system 200 may receive the OCR-outputted document text passages from the scanning/processing/storage stations 140 and 142 via the scan-and-convert network environment 110. Alternately, the OCR output text triage system 200 may be connected directly to the scanning/processing/storage stations 140 and 142. Moreover, the OCR-outputted document text passages could be created at some remote location and brought into the OCR output text triage system 200 through a transportable memory interface or from some other device connected to the network 110 which generates OCR-outputted document text passages.

Figure 2:
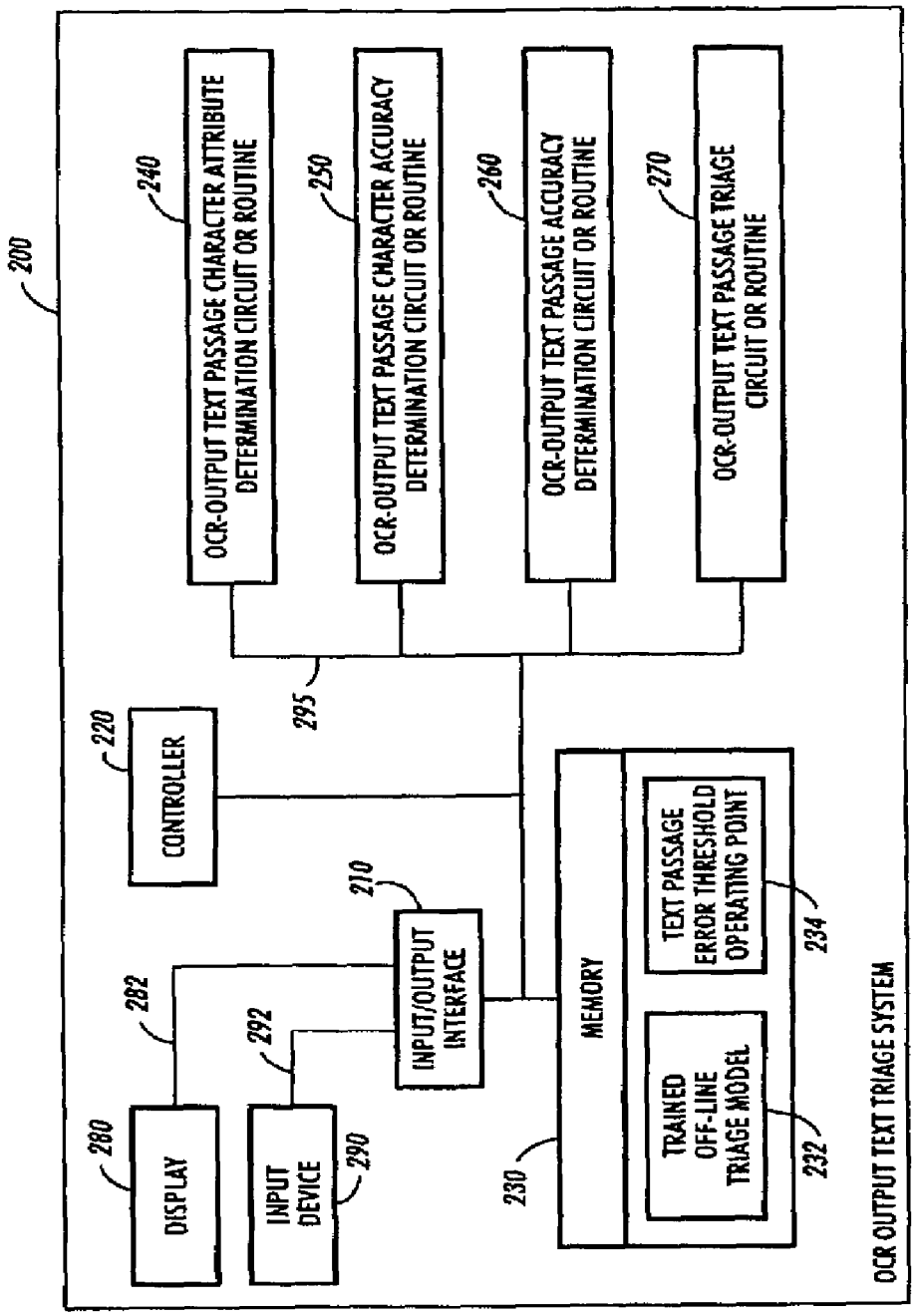
FIG. 2 is a functional block diagram of one exemplary embodiment of a system for automatic triage of text passages outputted from an OCR system according to this invention.

FIG. 2 illustrates a functional block diagram of one exemplary embodiment of the OCR output text triage system 200. The OCR output text triage system 200 connects to the network 110 via the link 214. The link 214 can be any known or later developed device or system for connecting the OCR output text triage system 200 to the network 110, including a connection over public switched telephone network, a direct cable connection, a connection over a wide area network, a local area network or a storage area network, a connection over an intranet or an extranet, a connection over the Internet, or a connection over any other distributed processing network or system. In general, the link 214 can be any known or later-developed connection system or structure usable to connect the OCR output text triage system 200 to the network 110.

As shown in FIG. 2, the OCR output text triage system 200 includes one or more display devices 280 usable to display information to the user, and one or more user input devices 290 usable to allow the user or users to input data into the OCR output text triage system 200. The one or more display devices 280 and the one or more input devices 290 are connected to the OCR output text triage system 200 through an input/output interface 210 via one or more communication links 282 and 292, respectively, which are generally similar to the link 214 above.

In various exemplary embodiments, the OCR output text triage system 200 includes one or more of a controller 220, a memory 230, a trained off-line triage model 232, a text passage error threshold operating point model 234, an OCR-output text passage character attribute determination circuit or routine 240, an OCR-output text passage character accuracy determination circuit or routine 250, an OCR-output text passage accuracy determination circuit or routine 260, and an OCR-output text passage triage circuit or routine 270, all of which are interconnected over one or more data and/or control buses and/or application programming interfaces 295. In various exemplary embodiments, the trained off-line triage model 232 and the text passage error threshold operating point model 234 are stored in memory 230 of the OCR output text triage system 200.

The controller 220 controls the operation of the other components of the OCR output text triage system 200. The controller 220 also controls the flow of data between components of the OCR output text triage system 200 as needed. The memory 230 can store information coming into or going out of the OCR output text triage system 200, may store any necessary programs and/or data implementing the functions of the OCR output text triage system 200, and/or may store data and/or OCR output text triage information at various stages of processing.

The memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the OCR output text triage system 200 includes the trained off-line triage model 232 which the OCR output text triage system 200 uses to process a set of OCR-output document text passages using the various circuits or routines 240, 250, 260 and/or 270 to automatically triage an OCR-outputted document text passage. The trained off-line triage model 232 is trained on a large sample of OCR-output characters contained within a large set of OCR-output text passages that had been evaluated, for example, manually proofed. The trained off-line triage model 232 is discussed in detail below.

In various exemplary embodiments, the OCR output text triage system 200 includes a text passage error threshold operating point model 234 which the OCR output text triage system 200 uses to process a set of OCR-output document text passages using the various circuits or routines 240, 250, 260 and/or 270 to automatically triage an OCR-outputted document text passage. The text passage error threshold operating point model 234 is used to select a threshold operating point that will, with high confidence, satisfy customer-specified quality requirements while minimizing the labor needed to process document text passages that are not triaged. The text passage error threshold operating point model 234 is discussed in detail below.

Figure 10:
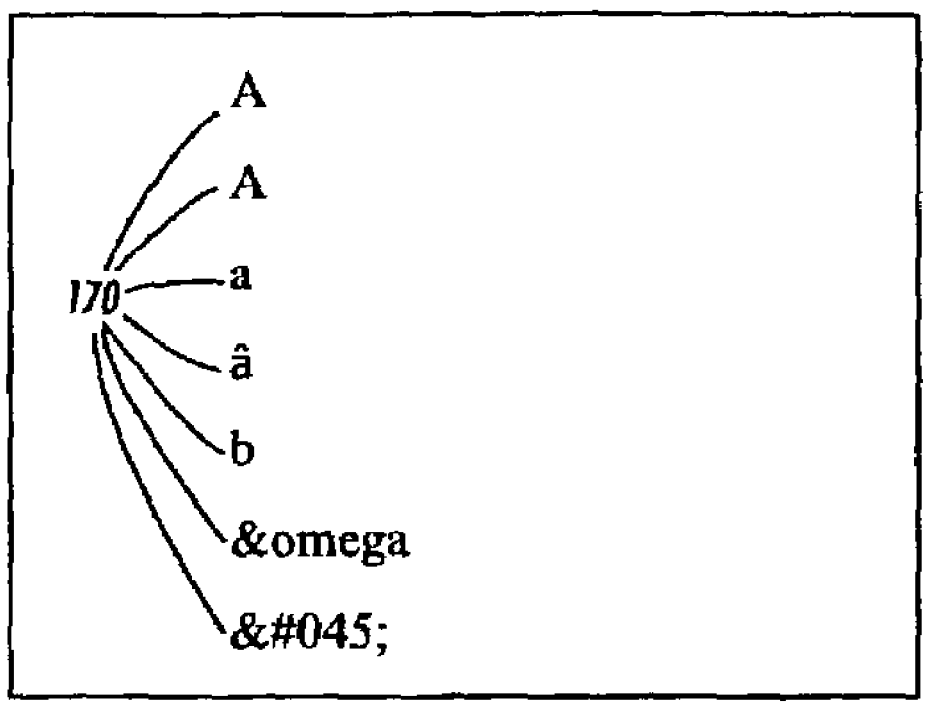
FIG. 10 provides examples of the types of OCR-output text characters that can be evaluated according to this invention.

The OCR-output text passage character attribute determination circuit or routine 240 is activated by the controller 220 evaluate OCR-output characters, shown as 170 in FIG. 10, contained in the OCR-output text passage. In various exemplary embodiments, a character may be expressed in several ways, such as, for example, a single utf8 multibyte representation of a single Unicode character which also includes all printable 7 bit ASCII characters, as an "entity reference" such as "&omega", "×", and "-", or the like.

Figure 4:
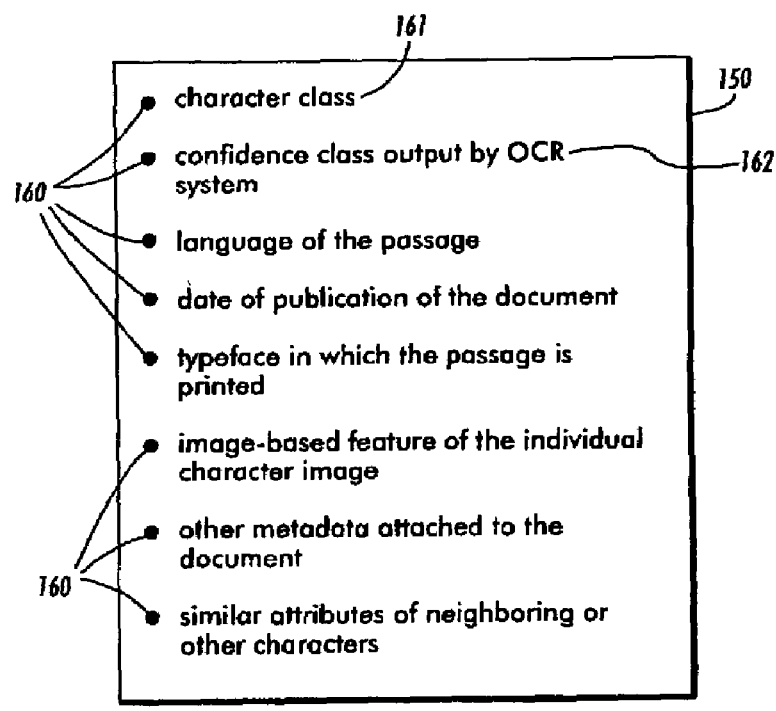
FIG. 4 provides examples of the types of OCR character attributes that can be evaluated according to this invention.

In various exemplary embodiments, the OCR-output text passage character attribute determination circuit or routine 240 identifies and selects, as shown in FIG. 4, specific OCR-output text passage character attributes 160, such as, for example, the character class, the confidence descriptor class provided by the OCR system, the language of the text passage, the date of publication of the document, the typeface in which the text passage is printed, image-based features of the individual character image and/or surroundings, metadata attached to the document, that may be present in the OCR-output text passage 150.

In various exemplary embodiments, the OCR-output text character attribute determination circuit or routine 240 identifies and selects all or only a subset of the OCR-output text character attributes, such as the character class 161 and the confidence descriptor class 162, as shown in FIG. 4, from the large group of potential OCR-output text character attributes 160, such as the character class, the confidence descriptor class provided by the OCR system, the language of the text passage, the date of publication of the document, the typeface in which the text passage is printed, image-based features of the individual character image and/or surroundings, metadata attached to the document, that are available to use in triaging OCR-outputted text passages.

The OCR-output text passage character accuracy determination circuit or routine 250 is activated by the controller 220 to determine, for each OCR-output character present in the OCR-output text passage, how accurately the OCR-output character is being interpreted by the OCR system. In various exemplary embodiments, the OCR-output text passage character accuracy determination circuit or routine 250 determines a character interpretation error value, such as, for example, a probability of error per character, $p_{(character\ error)}$ using models contained in the trained off-line triage model 232. In various exemplary embodiments, the determination of the character interpretation error value, such as, for example, the probability of error per character, $p_{(character\ error)}$, includes at least a determination of at least one OCR-output character attribute being erroneously interpreted by the OCR system, such as, for example a probability, $p_{(character\ attribute\ error)}$, of at least one OCR-output character attribute being erroneously interpreted by the OCR system The OCR-output text passage character accuracy determination circuit or routine 250 processes each OCR character, with its one or more character attributes selected, through the trained off-line triage model 232 to determine the character interpretation error value, such as, for example, the probability of error per character, $p_{(character\ error)}$. In various exemplary embodiments, the OCR-output text passage character accuracy determination circuit or routine 250 determines the character interpretation error value, such as, for example, the probability of error per character, $p_{(character\ error)}$, using one or more statistical algorithms or methods. In one exemplary embodiment, the OCR-output text passage character accuracy determination circuit or routine 250 determines the character interpretation error value, such as, for example, the probability of error per character, $p_{(character\ error)}$, using one or more latent conditional independence (LCI) statistical models included in the trained off-line triage model 232.

It should be noted that other known or later-developed statistical processes may be employed to process each OCR character with its attribute(s), including, for example, using one or more of language models such as character or word n-grams, Bayesian networks or other complex models of statistical dependence, and models of OCR error patterns.

The OCR-output text passage accuracy determination circuit or routine 260 is activated by the controller 220 to determine one or more OCR-output text passage-wise quality metrics or scores using various statistical algorithms or methods included in the trained off-line triage model 232. In various exemplary embodiments, the OCR-output text passage accuracy determination circuit or routine 260 determines one or more OCR-output text passage-wise quality metrics, such as, for example, a text passage error value represented as a probability, $p_{(text\ passage\ error)}$, that the entire OCR-output text passage is erroneously interpreted by the OCR system, an OCR-output text passage error rate, $R_{(text\ passage\ error\ rate)}$, or the like. In various exemplary embodiments, the OCR-output passage accuracy determination circuit or routine 260 determines the OCR-output text passage error rate, $R_{(text\ passage\ error\ rate)}$, by combining, for example summing up, the error probabilities determined for each character in a text passage, $\Sigma p_{(character\ error)}$, and then dividing the sum of error probability values, $\Sigma p_{(character\ error)}$, by the number, N, of characters contained in the text passage.

The OCR-output text passage triage circuit or routine 270 is activated by the controller 220 to automatically perform one or more text passage triage decisions. In various exemplary embodiments, the OCR-output text passage triage circuit or routine 270 automatically performs one or more text passage triage decisions by comparing the one or more determined OCR-output text passage-wise quality metrics, such as, for example, the OCR-output text passage error rate, $R_{(text\ passage\ error\ rate)}$, against a predetermined OCR-output text passage threshold error rate, $R_{(text\ passage\ threshold\ error\ rate)}$, included in the text passage error threshold operating point model 234.

Based on the results of these error rate comparisons, the OCR-output text passage triage circuit or routine 270 also automatically determines the best post-OCR processing step required for that particular text passage. Post-OCR processing steps may include, for example, sending the OCR text passage directly to the end user without any post-OCR rekeying or correction, sending the OCR text passage through a post-OCR inspection and correction stage, sending the original text passage image to be completely keyed in manually, or a combination thereof. The determination of what post-OCR processing step may be taken is based at least on predetermined threshold error rate values, for example, as provided by a client.

Figure 5:
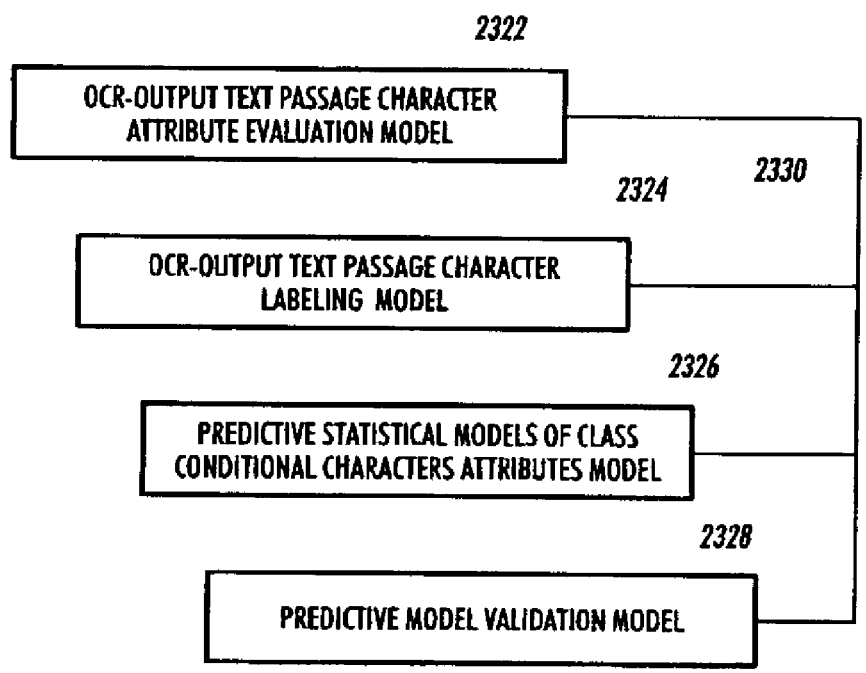
FIG. 5 is a functional block diagram showing in greater detail one exemplary embodiment of the trained off-line triage model of FIG. 2, according to this invention.
Figure 7:
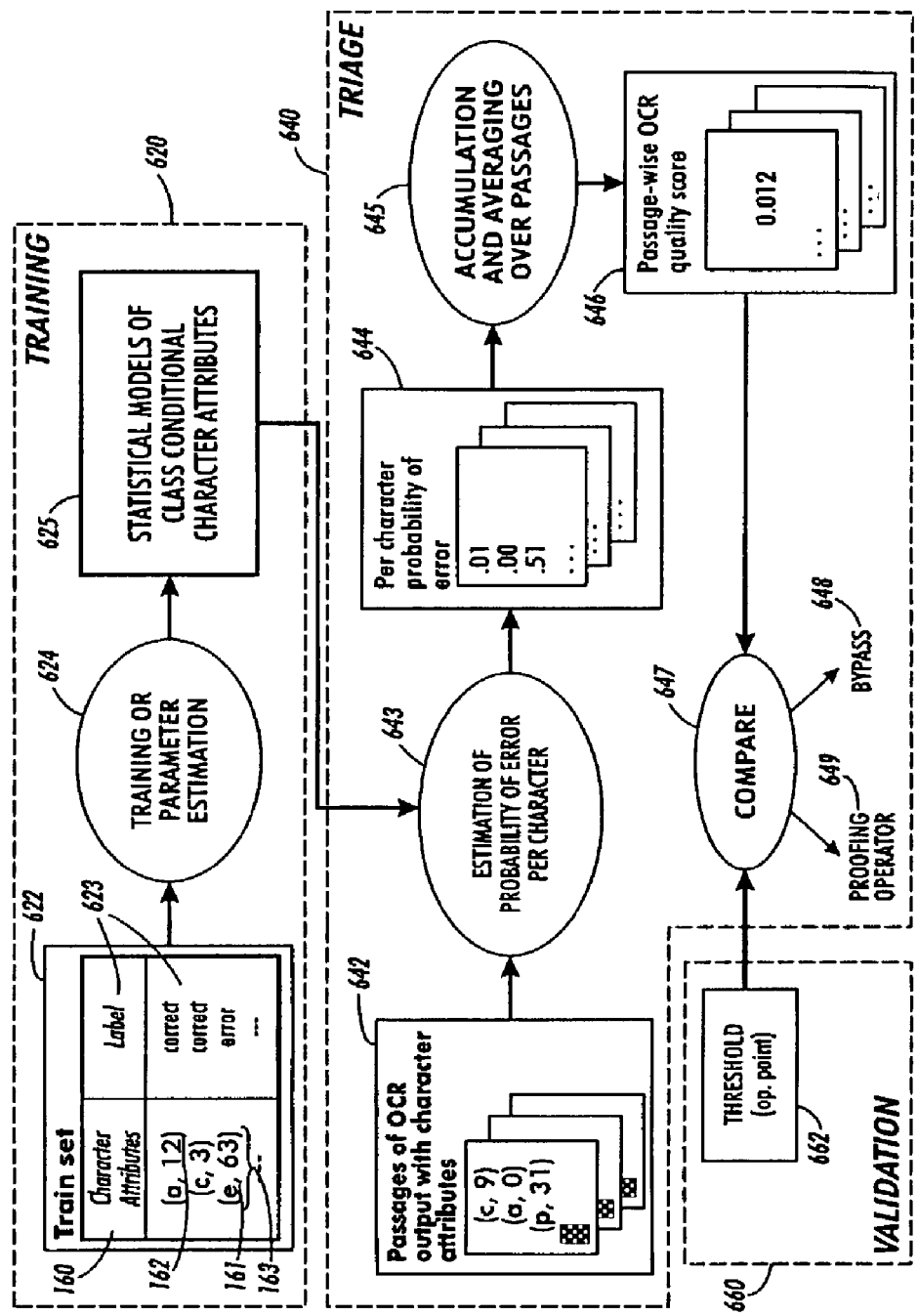
FIG. 7 is a high-level schematic representation of one exemplary embodiment of the implementation of the method for triage of OCR-output text passages according to this invention.

FIG. 5 shows in greater detail one exemplary embodiment of the trained off-line triage model 232. FIG. 7 is a high-level schematic representation of one exemplary embodiment of the implementation stages or blocks of the method for triage of OCR-output text passages. As shown in FIG. 7, block 620 is an exemplary embodiment of a method of developing a trained off-line triage model 232.

As shown in FIG. 5, in one exemplary embodiment, the trained off-line triage model 232 includes an OCR-output text passage character attribute evaluation model 2322, an OCR-output text passage character labeling model 2324, a predictive model 2326 usable to determine probability distributions for OCR-output characters being correctly or erroneously interpreted by the OCR system, and a validation model 2328 usable to test, characterize and/or improve the developed predictive model 2326.

In various exemplary embodiments, the OCR-output text passage character attribute evaluation model 2322 determines, for example identifies and selects, at least one exemplary character attribute in an OCR-output text passage from a plurality of character attributes. As shown in FIG. 4, exemplary character attributes 160 include character class, confidence descriptor class, for example, confidence score provided by the OCR system, language of the text passage, date of publication of the document, typeface in which the text passage is printed, image-based features of the individual character image and/or surrounding, and metadata attached to the document. In an exemplary embodiment, as shown in FIG. 7, the OCR-output text passage character attribute evaluation model 2322 selects for evaluation two character attributes, a character class 161 and a confidence descriptor class or confidence score 162, from the plurality of character attributes 160. It will be noted that OCR systems generally attach confidence scores to each character interpretation. These confidence scores are, typically, integers within a narrow range of values. In an exemplary embodiment, the confidence scores assigned to OCR-output characters by an OCR system, for example ScanSoft"s TextBridge® OCR system, are in a range of 0 to 255.

In various exemplary embodiments, the OCR-output text passage character labeling model 2324 is used to label each OCR character in a training text passage data set as correct or incorrect using one or more algorithms or methods. In various exemplary embodiments, the OCR-output text passage character labeling model 2324 evaluates, at the character level, a training data set, shown as 622 in FIG. 7, consisting of OCR-output text. The OCR-output text passage character labeling model 2324 then compares the training data set 622 against a corresponding "ground-truth" or correct text. It will be noted that because of limitations associated with the OCR process and technology, the OCR-output text in the training set is generally errorful, while the corresponding ground-truth text is generally highly accurate following a manual proofing step. Ground-truth text is commonly available in large quantities in such service bureaus, since it is the routine finished product of the process.

In one embodiment, the OCR-output text passage character labeling model 2324 is used to label each OCR character as "correct" or "error", shown as 623 in FIG. 7, using a string matching algorithm model, such as the model outlined in "The string to string correction problem," R. A. Wagner et al., Journal of Association of Computing Machinery, 21:168–178, 1974, incorporated herein by reference in its entirety.

It should be noted that other known or later-developed algorithms or methods may be employed to evaluate, label and/or compare each OCR character as "correct" or "error", including, for example, using a dynamic programming process, such as Unix "diff" programming process, or a more sophisticated process that takes into account models of OCR error patterns and human error patterns in ground-truth generation.

In various exemplary embodiments, once each OCR character in the training data set is automatically labeled as "correct" or "error," the model 2326 is used to produce statistical models of the relationship between the OCR accuracy and the attributes of a particular OCR-output character. In various exemplary embodiments, the model 2326 is used to produce predictive statistical models of class conditional character attributes, shown as 625 in FIG. 7, based on one or more latent conditional independence (LCI) statistical techniques or methods. In various exemplary embodiments, the model 2326 produces LCI-based statistical models 625 of the OCR-output character class and the OCR-output character confidence class or score, as best fitted by the data in the training data set, shown as 622 in FIG. 7, in terms of maximum likelihood sense, as described below.

In various exemplary embodiments, for each passage text character 170 having character attributes 160, the OCR system generates a string of pairs (m, n), shown as 163 in FIG. 7, where "m" 161 is a character attribute, and "n" 162 is a character confidence descriptor or confidence class. Each pair 163 is determined as either being "correct", for example the character attribute "m" 161 matches the ground-truth, or being "error", for example the character attribute "m" 161 does not match the ground-truth. Given the above observation, the a posteriori probability of error p(error|m,n) can be determined using Equation 1 below:

$$p(\text{error} \mid m, n) = \frac{p(m, n \mid \text{error})p(\text{error})}{p(m, n \mid \text{error})p(\text{error}) + p(m, n \mid \text{correct})p(\text{correct})} \quad (1)$$

In various exemplary embodiments, for each character, each of the two conditional joint distributions over (m, n), conditioned on "correct" and "error," respectively, are modeled as latent conditionally independent (LCI) with K factors, where K is chosen experimentally to avoid over-fitting. The LCI models allow for different groups of character attributes, such as, for example, lower case, numeric and punctuation, to have different distributions of confidence classes or scores.

In various exemplary embodiments, at the OCR-output character level, at least one LCI-based model that best fits the data in the training data set in the maximum likelihood sense is determined for each of the two categories, "correct" and "error." In various exemplary embodiments, the at least one LCI-based model, shown as 625 in FIG. 7, is determined using various statistical algorithms or methods. In an exemplary embodiment, the at least one LCI-based model is determined using an Expectation Maximization (EM) algorithm model, such as the model outlined in "Maximum likelihood from incomplete data via the EM algorithm," A. P. Dempster et al., Journal of the Royal Statistical Society, 39(1), pp. 1–38, 1977, incorporated herein by reference in its entirety.

In various exemplary embodiments, the statistics for determining the multinomial LCI-based triage models may include, for example the number of occurrences of each (m, n) pair for each "correct" or "error" category. In one exemplary embodiment, the predictive statistical models of class conditional character attributes for triage of text passages, shown as 625 in FIG. 7, may be determined by performing a fixed number of iterations of the EM algorithm model without directly measuring convergence criteria.

In various exemplary embodiments, the predictive model validation model 2328 is used to empirically validate the predictive statistical models, shown as 625 in FIG. 7, of class conditional character attributes against a validation data set. The predictive model validation model 2328 processes a validation set of text passage data, which were previously labeled with respect to their character accuracy, through the predictive models 625 to generate one or more operating characteristics. In one exemplary embodiment, the predictive model validation model 2328 processes a validation set of text passage data through the predictive models 625 to generate one or more operating characteristics that empirically quantify the trade off between the "triage rate", which affects operating costs, and the "false hit rate", which affects the probability that a customer quality standard will be met.

In various exemplary embodiments, generating one or more operating characteristics that empirically quantify the trade off between the triage rate and the false hit rate facilitates the determination of a choice of a threshold operating point, shown as 662 in FIG. 7. The threshold operating point 662 may be used during text passage triage to maximize the number of text passages triaged while maintaining a reasonably low risk that too many text passages will exceed a predetermined error target. It will be noted that in an exemplary embodiment, the predetermined error target is set by a service bureau customer, while an acceptable risk level value is chosen by the service bureau managers.

Figure 6:
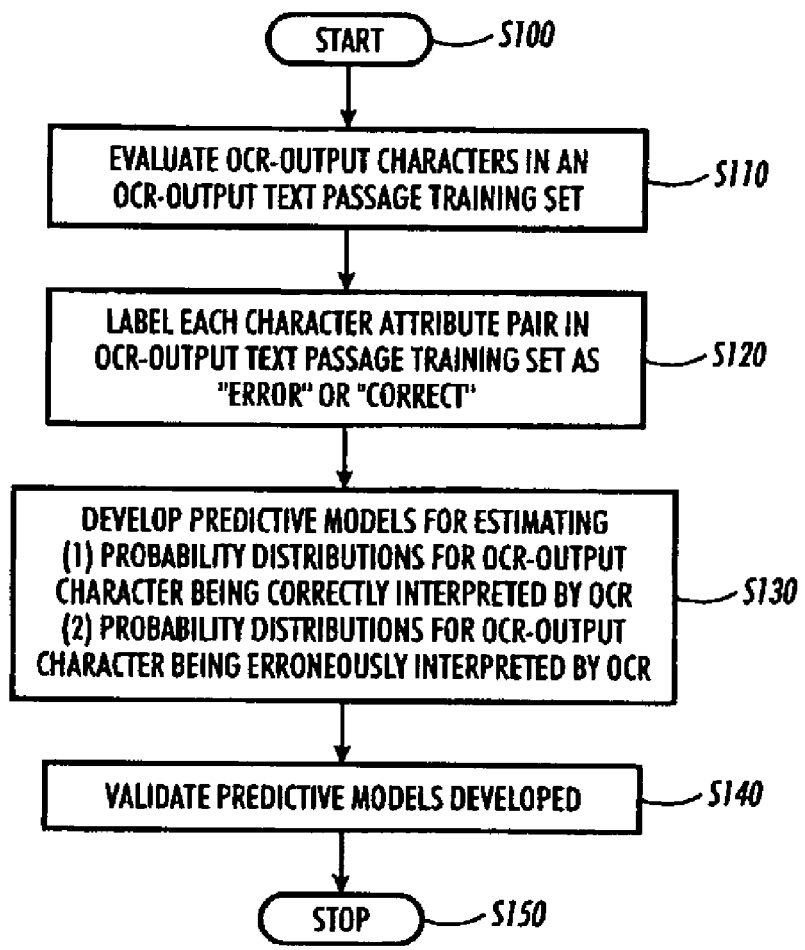
FIG. 6 is a flowchart outlining one exemplary embodiment of a method for training an off-line model usable to determine statistical models of class conditional character attribute according to this invention.

FIG. 6 is a flowchart outlining one exemplary embodiment of a method for creating or "training" an off-line triage model as a function of the OCR-output character attributes according to this invention. As shown in FIG. 6, the method begins in step S100, and continues to step S110, where one or more character attributes contained in an OCR-output text passage are selected from a plurality of character attributes. In various exemplary embodiments, the character attributes selected include the character class and the confidence descriptor class provided by the OCR system.

Then, in step S120, each OCR character in a training text passage data set of the off-line triage model is labeled as correct or incorrect using one or more algorithms or methods. In various exemplary embodiments, the training data set, consisting of OCR-output text, is evaluated and compared, at the character level, to corresponding "ground-truth" or correct text. Each OCR character is then labeled as "correct" or "error" using a string matching algorithm model, such as the model outlined in "The string to string correction problem," R. A. Wagner et al., Journal of Association of Computing Machinery, 21:168–178, 1974, incorporated herein by reference in its entirety. It should be noted that other known or later-developed algorithms or methods may be employed to evaluate, label and/or compare each OCR character as "correct" or "error", including, for example, using a dynamic programming process, such as Unix "diff" programming process, or a more sophisticated process that takes into account models of OCR error patterns and human error patterns in ground-truth generation.

Then, in step S130, once each OCR character is labeled and encoded as "correct" or "error," statistical models representing a relationship between the OCR accuracy and the attributes of a particular OCR-output character are determined. In various exemplary embodiments, predictive statistical models of class conditional character attributes are determined using one or more latent conditional independence (LCI) statistical techniques or methods. In an exemplary embodiment, predictive LCI-based models are determined using an Expectation Maximization (EM) algorithm model, such as the model outlined in "Maximum likelihood from incomplete data via the EM algorithm," A. P. Dempster et al., Journal of the Royal Statistical Society, 39(1), pp. 1–38, 1977, incorporated herein by reference in its entirety. In an exemplary embodiment, predictive models usable to estimate probability distributions for an OCR-output character being correctly or erroneously interpreted by an OCR system are determined.

Next, in step S140, the developed LCI-based models usable to triage text passage characters, and thus text passages, are validated, such as for example, tested, characterized and/or improved. Operation then continues to step S150, where the operation of the training method stops.

In various exemplary embodiment, the validation of the LCI-based models may include processing a set of text passages that have been labeled with their "true quality' scores, as computed using a customer quality standard, through the developed predictive models. It will be noted that the text passages in the validation set are different from the text passages used in "training" the predictive models.

In various exemplary embodiments, the result of validation is an "operating curve" describing how well the triage model works for each setting of a "triage threshold" value. The performance of the triage model is measured in two ways: (1) the "triage rate," which affects operating costs, and (2) the "false hit rate," which affects the probability that the customer quality standard will be met. In an exemplary embodiment, an operation manager may examine the operating curve to select a threshold that will, with high confidence, meet customer accuracy requirements while minimizing operating costs.

Figure 8:
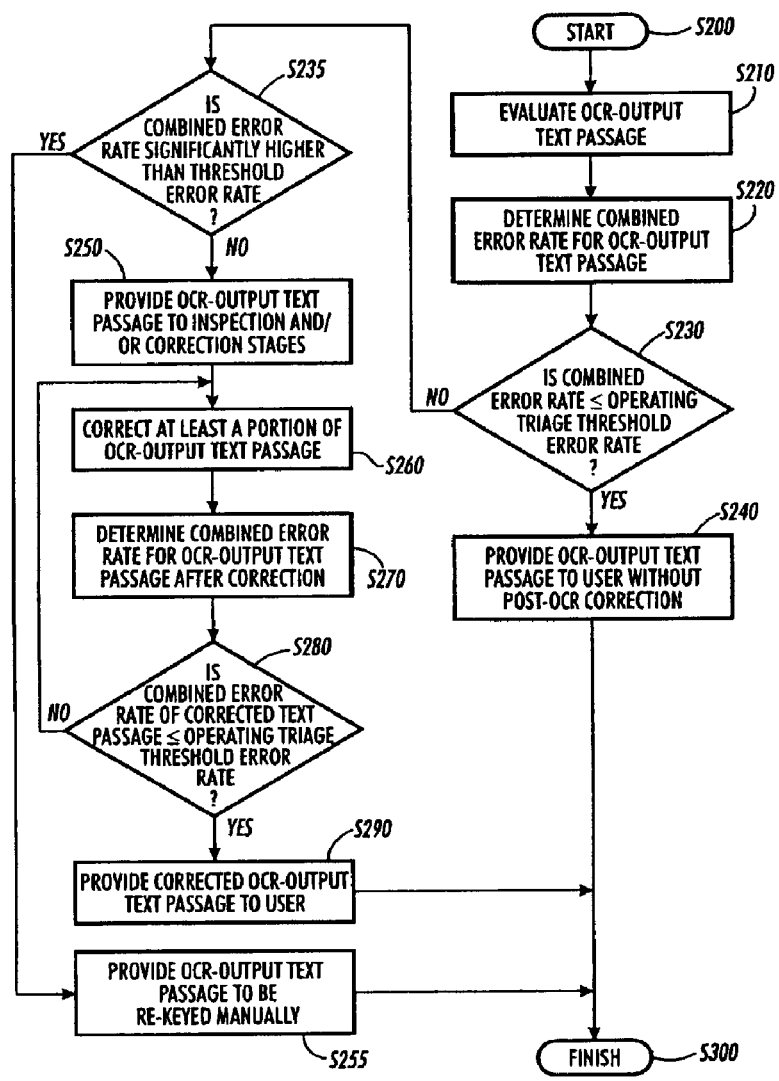
FIG. 8 is a flowchart outlining one exemplary embodiment of a method for on-line triage of an OCR-output text passage according to this invention.

FIG. 7 is a high-level schematic representation of one exemplary embodiment of the implementation stages or blocks of the method for triage of OCR-output text passages according to this invention. FIG. 8 is a flowchart outlining one exemplary embodiment of a method for triage of an OCR-output text passage according to this invention.

As shown in FIG. 8, the method begins in step S200, and continues to step S210, where each OCR-output text passage is evaluated using the trained off-line triage model. In various exemplary embodiments, the OCR-output text passage is evaluated by determining at least one OCR-output character attribute for each OCR-output character in the OCR-output text passage. In one exemplary embodiment, determining at least one OCR-output character attribute for each OCR-output character includes selecting at least one OCR-output character attribute from a plurality of OCR-output character attributes. As described above, in one exemplary embodiment, the plurality of OCR-output character attributes may include at least some of character classes, confidence descriptor classes, languages of text passage, text passage publication date, typefaces in which text passages are printed, image-based features of an individual character image and metadata attached to text passages.

Then, in step S220, for each evaluated OCR-output text passage, a text passage error rate is determined using the trained off-line triage model and the determined OCR-output character attribute(s) in the OCR-output text passage. Next, in step S230, the error rate determined for each OCR-output text passage is compared with a predetermined OCR-output text passage threshold error rate. Based on the results of this comparison, an OCR-output text passage triage decision is made.

In various exemplary embodiments, the OCR-output text passage triage decision may include at least one of sending the OCR-output text passage directly to an end user without post-OCR rekeying or correction, shown as step S240 in FIG. 8, sending the OCR-output text passage through a post-OCR inspection and correction stage, shown as step S250, sending the original text passage image to be completely keyed in manually, shown as Step S255, or a combination thereof. In the exemplary embodiments where the OCR-output text passage is provided to the user without post-OCR correction S240 or the OCR-output text passage is sent to be manually rekeyed S255, operation continues to step S300, where the operation of the OCR-output triage method stops.

In various exemplary embodiments, for the triage decision of sending the OCR-output text passage through a post-OCR inspection and correction stage, step S250, the method continues in step S260 where at least a portion of the OCR-output text passage is sent to be corrected after being identified as requiring correction by the OCR-output text triage system. Next, at step S270, the corrected OCR-output text passage is provided again to the triage system for evaluation. A corrected OCR-output text passage error rate is next determined and compared to the predetermined OCR-output text passage threshold error rate. If the error rate of the corrected OCR-output text passage is less than predetermined threshold error rate, the corrected OCR-output text passage is provided to the end user, as shown in step S290 in FIG. 8. Operation then continues to step S300, where the operation of the OCR-output triage method stops.

Figure 9:
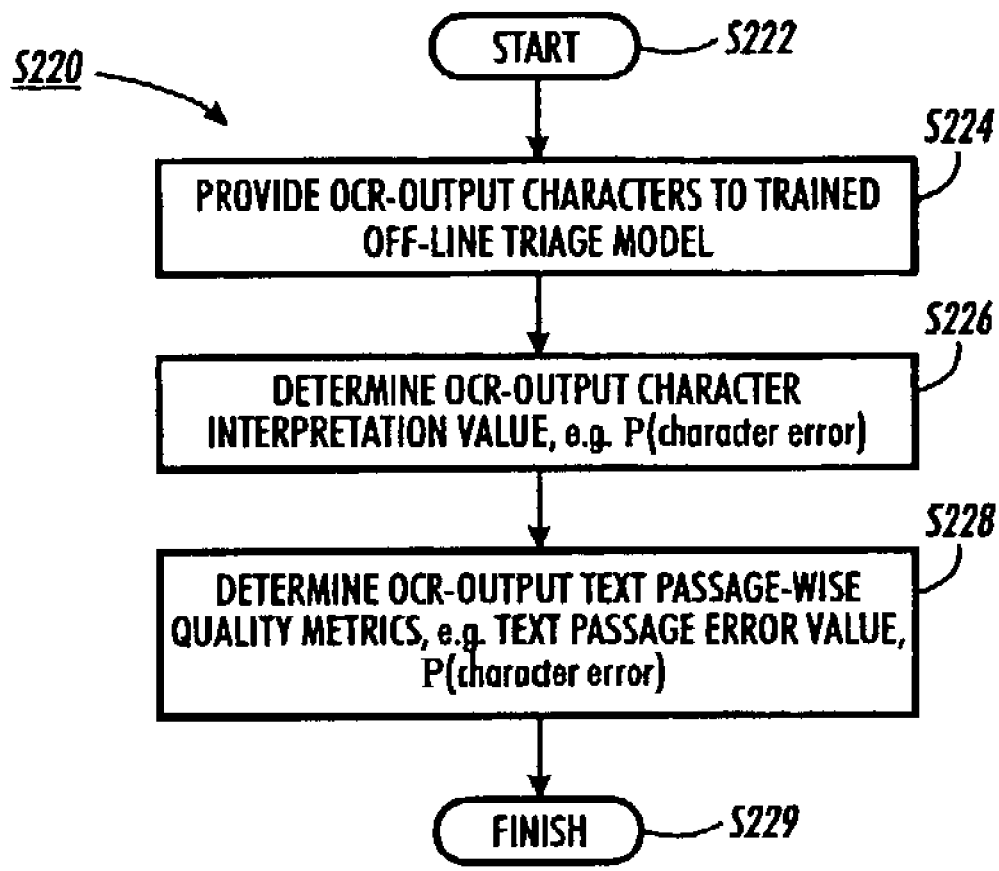
FIG. 9 is a flowchart outlining in more detail one exemplary embodiment of one of the steps of the method for triage of an OCR-output text passage of FIG. 8.

FIG. 9 is a flowchart outlining one exemplary embodiment of step S220, determining a text passage error rate for each OCR-output text passage evaluated using a trained off-line triage model based on the determined at least one OCR-output character attribute. As shown in FIG. 9, the method begins in step S222, and continues to step S224, where each OCR-output character, with its selected attributes, is provided to the trained off-line triage model.

Next, in step S224, for each OCR-output character present in the OCR-output text passage, a determination is made of how accurately each OCR-output character is being interpreted by the OCR system. In various exemplary embodiments, this determination is performed by determining a character interpretation error value, such as, for example, a probability of error per character, $p_{(character\ error)}$ using models contained in the trained off-line triage model. In various exemplary embodiments, the determination of the character interpretation error value, such as, for example, the probability of error per character, $p_{(character\ error)}$, includes at least a determination of at least one OCR-output character attribute being erroneously interpreted by the OCR system, such as, for example a probability, $p_{(character\ attribute\ error)}$, of at least one OCR-output character attribute being erroneously interpreted by the OCR system In various exemplary embodiments, the character interpretation error value, such as, for example, the probability of error per character, $p_{(character\ error)}$, is determined using one or more statistical algorithms or methods in the trained off-line triage model. In one exemplary embodiment, the character interpretation error value, such as, for example, the probability of error per character, $p_{(character\ error)}$, is determined using one or more latent conditional independence (LCI) statistical models included in the trained off-line triage model.

It should be noted that other known or later-developed statistical processes may be employed to process each OCR character with its attribute(s), including, for example, using one or more of language models such as character or word attribute n-grams, Bayesian networks or other complex models of statistical dependence, and models of OCR error patterns.

Then, in step S226, one or more OCR-output text passage-wise quality metrics or scores are determined using various statistical algorithms or methods included in the trained off-line triage model. In various exemplary embodiments, one or more OCR-output text passage-wise quality metrics are determined, such as, for example, a text passage error value represented as a probability, $p_{(text\ passage\ error)}$, that the entire OCR-output text passage is erroneously interpreted by the OCR system, an OCR-output text passage error rate, $R_{(text\ passage\ error\ rate)}$, or the like.

In various exemplary embodiments, the text passage error value, for example the probability $p_{(text\ passage\ error)}$, is determined by combining the error probability values determined for each character in the text passage, $\Sigma p_{(character\ error)}$. In various exemplary embodiments, the OCR-output text passage error rate, $R_{(text\ passage\ error\ rate)}$, is determined by combining, for example summing up, the error probabilities determined for each character in a text passage, $\Sigma p_{(character\ error)}$, and then dividing the sum of error probability values, $\Sigma p_{(character\ error)}$, by the number, N, of characters contained in the text passage.

Operation then continues to step S229, where the operation of the method stops.

The method and systems according to this invention were implemented and their accuracy evaluated by the inventors. Specifically, 1413 scanned pages were processed with the TextBridge® OCR system at the inventors' facility. The text on the pages was manually keyed in to provide ground-truth data. The OCR output, such as, for example, character labels and confidence scores, for each page was then aligned to ground-truth text using dynamic programming, for example Unix "diff", to obtain "error" or "correct" labels for each character label-confidence score pair.

The 1413 pages were then randomly permuted and partitioned into two samples of 706 and 707 pages respectively. The first sample was used for training the LCI models for "error" and "correct" groups, each model having 5 factors, for example K=5. The second sample was used for validation.

Table 1 shows the operating characteristics, such as, for example, false-hit rate vs. triage rate on the validation set. The false hit and triage rates were computed for different values of the threshold average a posteriori probability of error and a target quality of $\leq 1.5\%$ OCR error. INSERT TABLE

TABLE 1

Operating characteristics on validation data: LCI model based triaging method.

| Operating threshold | Triage rate (% of total) | False hit rate % | Good and triaged | Bad but triaged ('false hits') | Good but manually corrected ('false alarms') | Bad and manually corrected | Total tested |
|---|---|---|---|---|---|---|---|
| 0.002 | 0.00 | 0.00 | 0 | 0 | 469 | 238 | 707 |
| 0.004 | 3.25 | 0.00 | 23 | 0 | 446 | 238 | 707 |
| 0.006 | 11.60 | 0.00 | 82 | 0 | 387 | 238 | 707 |
| 0.008 | 22.21 | 0.00 | 157 | 0 | 312 | 238 | 707 |
| 0.010 | 35.08 | 0.85 | 242 | 6 | 227 | 232 | 707 |
| 0.011 | 40.88 | 1.27 | 280 | 9 | 189 | 229 | 707 |
| 0.012 | 47.38 | 2.55 | 317 | 18 | 152 | 220 | 707 |
| 0.014 | 55.73 | 4.95 | 359 | 35 | 110 | 203 | 707 |
| 0.016 | 67.33 | 8.35 | 417 | 59 | 52 | 179 | 707 |
| 0.018 | 74.26 | 12.16 | 439 | 86 | 30 | 152 | 707 |

Of the 707 pages in the validation set, OCR output on 469 pages, or about 66%, met the target quality. With an operating threshold of 0.011 on the average a posteriori probability of error, 289 pages, or about 41%, were triaged and bypass manual intervention. Of these, 280 were among the 469 "good quality" pages. Nine of the triaged pages did not actually meet target quality, representing a false hit rate of 1.3%, as an example of customer-specified tolerance.

Thus, the triage method of this invention, applied to this set of page images, has been shown capable of bypassing manual correction for 41% of the document stream fully automatically and without compromising the quality goals established by the customer.

Although the systems and methods for triage of OCR-output text passages according to this invention have been described in the context of using only a two-dimensional model, where the dimensions are character class and confidence class or score, the systems and methods for triage of OCR-output text passages are not limited to such two-dimensional models. The LCI model training and classification algorithms included in the trained off-line triage model can cope with higher dimensions. Thus, knowledge of any other characteristic of documents, such as, for example, including typeface, language, content topic, and image quality, may be included in the determinations performed using the trained off-line triage model.

The systems and methods for triage of OCR-output text passages according to this invention may be employed to automatically perform triage of OCR-output text passages, including for example, performing various "on-line" and "off-line" triage operations and decisions. In one exemplary embodiment of an "on-line" triage operation and decision, as the manual correction operator works down a page, overall page quality is continually re-estimated, so that the operator can be instructed to stop when the per-page accuracy target has, with sufficiently high statistical confidence, been reached.

In another exemplary embodiment, the systems and methods for triage of OCR-output text passages according to this invention may be employed to triage shorter passages, for example individual words, such that manual correction is directed to the most urgent corrections first. This exemplary embodiment and the immediately above-described embodiment are complementary and may be combined to enhance the capabilities of the systems and methods for triage of OCR-output text passages according to this invention.

Although the invention has been described in detail, it will be apparent to those skilled in the art that various modifications may be made without departing from the scope of the invention.

What is claimed is:

1. A method for automatic triage of a text passage outputted by an optical character recognition system, the OCR-output text passage having multiple text segments, individual ones of the text segments including at least one OCR-output character, the method comprising:
   determining at least one OCR-output character attribute for each of the OCR-output characters in the OCR-output text passage;
   determining an error rate for the OCR-output text passage as a whole using a triage model and the determined OCR-output character attributes; and
   comparing the determined error rate for the OCR-output text passage with an OCR-output text passage threshold error rate to perform an OCR-output text passage triage decision.

2. The method of claim 1, wherein determining an error rate for the OCR-output text passage comprises:
   providing the OCR-output character attributes to the triage model;
   determining a character interpretation error value for each OCR-output character based on a probability of the at least one OCR-output character attribute being erroneously interpreted by the system; and determining a text passage error value based on the at least one character interpretation error value determined for each OCR-output character.

3. The method of claim 2, further comprising:
determining a number representing a sum of OCR-output characters in the OCR-output text passage; and
dividing the text passage error value by the number representing the sum of OCR-output characters.

4. The method of claim 1, wherein determining at least one OCR-output character attribute for each OCR-output character comprises selecting the at least one OCR-output character attribute from a plurality of OCR-output character attributes.

5. The method of claim 4, wherein the plurality of OCR-output character attributes includes at least one of a character class, a confidence descriptor class, a language of the text passage, a text passage publication date, a typeface in which the text passage is printed, an image-based feature of an individual character image and metadata attached to the text passage.

6. The method of claim 1, wherein the text passage to be triaged includes at least one of pages, characters, words, phrases, text-lines, sentences, paragraphs, columns of text, blocks of text, text articles, multi-page documents, collections of single-page documents and collections of multi-page documents.

7. The method of claim 1, wherein the OCR-output text passage triage decision includes at least one of sending the OCR-output text passage directly to an end user without post-OCR processing, sending the OCR-output text passage through a post-OCR inspection and processing stage, and sending the original text passage image to be keyed in manually.

8. The method of claim 1, wherein the triage model is a trained off-line triage model.

9. The method of claim 1, wherein the OCR-output text passage threshold error rate is a predetermined value.

10. The method of claim 7, wherein sending the OCR-output text passage through the post-OCR inspection and processing stage comprises:
determining at least one text passage error probability value for each OCR-output text passage as a correction operator detects and corrects an error in the OCR-output text passage; and
alerting the correction operator when the at least one text passage error probability value is improved so as to meet the OCR-output text passage threshold error value,
wherein the text passage error probability value for each OCR-output text passage is based on a probability of the respective OCR-output character attributes being erroneously interpreted by the system.

11. The method of claim 10, wherein determining the text passage error probability value for an OCR-output text passage comprises:
determining OCR-output text passage error probability values for a plurality of selected portions of the OCR-output text passage; and
arranging the plurality of selected portions of the OCR-output text passage based on the determined OCR-output text passage error probability values such that the selected portions having the highest OCR-output text passage error probability values are displayed first to the correction operator.

12. A computer-implemented method for triage of a plurality of OCR-output text passages, each OCR-output text passage having multiple text segments, individual ones of the text segments including at least one OCR-output character, the method comprising:
selecting a set of OCR-output character attributes from a plurality of OCR-output character attributes for each OCR-output character;
determining an OCR-output character error value for each OCR-output character based on a probability of the set of OCR-output character attributes being erroneously interpreted by the OCR system;
determining a text passage error value for each OCR-output text passage as a whole based on a probability of the text passage being erroneously interpreted by the OCR system as determined using at least the OCR-output character error values; and
comparing the determined text passage error value with an OCR-output text passage threshold error value to perform an OCR-output text passage triage decision.

13. The computer-implemented method of claim 12, wherein the probability of the set of OCR-output character attributes being erroneously interpreted by the OCR system is determined based on at least the selected set of OCR-output character attributes processed using the triage model.

14. The computer-implemented method of claim 12, wherein the plurality of OCR-output character attributes includes at least one of a character class, a confidence descriptor class, a language of the text passage, a text passage publication date, a typeface in which the text passage is printed, an image-based feature of an individual character image and metadata attached to the text passage.

15. The computer-implemented method of claim 12, wherein the text passage to be triaged includes at least one of pages, characters, words, phrases, text-lines, sentences, paragraphs, columns of text, blocks of text, text articles, multi-page documents, collections of single-page documents and collections of multi-page documents.

16. The computer-implemented method of claim 12, wherein the OCR-output text passage triage decision includes at least one of sending the OCR-output text passage directly to an end user without post-OCR processing, sending the OCR-output text passage through a post-OCR inspection and processing stage, and sending the original text passage image to be keyed in manually.

17. The computer-implemented method of claim 16, wherein sending the OCR-output text passage through a post-OCR inspection and processing stage comprises:
determining at least one text passage error probability value for each OCR-output text passage as a correction operator detects and corrects an error in the OCR-output text passage; and
alerting the correction operator when the at least one text passage error probability value is improved so as to meet the OCR-output text passage threshold error value,
wherein the text passage error probability value for each OCR-output text passage is based on a probability of the respective sets of OCR-output character attributes being erroneously interpreted by the system.

18. The computer-implemented method of claim 12, wherein
determining a text passage error probability value for an OCR-output text passage comprises: determining OCR-output text passage error probability values for a plurality of selected portions of the OCR-output text passage; and
arranging the plurality of selected portions of the OCR-output text passage based on the determined OCR-output text passage error probability values such that the selected portions having the highest OCR-output text passage error probability values are displayed first to the correction operator.

19. An OCR-output text passage triage system that triages a text passage outputted by an optical character recognition system, the OCR-output text passage including multiple text segments, individual ones of the text segments including at least one OCR-output character, each having at least one OCR-output character attribute, the system comprising:

an OCR-output text passage character accuracy determination circuit or routine that determines a character interpretation error value for individual OCR-output characters within the OCR-output text passage using a triage model;

an OCR-output text passage accuracy determination circuit or routine that determines at least one OCR-output text passage quality metric for the text passage as a whole using the determined character interpretation error value and at least one statistical algorithm or model included in the triage model; and an OCR-output text passage triage circuit or routine that performs one or more text passage triage decisions using the determined at least one OCR-output text passage quality metric and an OCR-output text passage threshold error rate value.

20. The OCR-output text passage triage system of claim 19, wherein the triage model is a trained off-line triage model.

21. The OCR-output text passage triage system of claim 19, wherein the OCR-output text passage threshold error rate value is included in a text passage error threshold operating point model.

22. The OCR-output text passage triage system of claim 19, wherein the at least one OCR-output character attribute includes at least one of a character class, a confidence descriptor class, a language of the text passage, a text passage publication date, a typeface in which the text passage is printed, an image-based feature of an individual character image and metadata attached to the text passage.

23. The OCR-output text passage triage system of claim 19, wherein the text passage to be triaged includes at least one of pages, characters, words, phrases, text-lines, sentences, paragraphs, columns of text, blocks of text, text articles, multi-page documents, collections of single-page documents and collections of multi-page documents.

24. The OCR-output text passage triage system of claim 19, wherein the OCR-output text passage triage decision includes at least one of sending the OCR-output text passage directly to an end user without post-OCR rekeying or correction, sending the OCR-output text passage through a post-OCR inspection and correction stage, and sending the original text passage image to be completely keyed in manually.

25. A computer-readable medium that provides instructions for triage of a text passage outputted by an optical character recognition system, the OCR-output text passage having multiple text segments, individual ones of the text segments including at least one OCR-output character, instructions, which when executed by a processor, cause the processor to perform operations comprising:

determining at least one OCR-output character attribute for each of the OCR-output characters in the OCR-output text passage;

determining an error rate for the OCR-output text passage as a whole using a triage model and the determined OCR-output character attributes; and comparing the determined error rate for the OCR-output text passage with an OCR-output text passage threshold error rate to perform an OCR-output text passage triage decision.

26. The computer-readable medium of claim 25, wherein determining an error rate for the OCR-output text passage comprises:

providing the OCR-output character attribute to the triage model;

determining a character interpretation error value for each OCR-output character based on a probability of the at least one OCR-output character attribute being erroneously interpreted by the system; and determining a text passage error value based on the at least one character interpretation error value determined for each OCR-output character.

27. The computer-readable medium of claim 26, further comprising:

determining a number representing a sum of OCR-output characters in the OCR-output text passage; and dividing the text passage error value by the number representing the sum of OCR-output characters.

28. The computer-readable medium of claim 25, wherein determining at least one OCR-output character attribute for each OCR-output character comprises selecting the at least one OCR-output character attribute from a plurality of OCR-output character attributes.

29. The computer-readable medium of claim 28, wherein the plurality of OCR-output character attributes includes at least one of a character class, a confidence descriptor class, a language of the text passage, a text passage publication date, a typeface in which the text passage is printed, an image-based feature of an individual character image and metadata attached to the text passage.

30. The computer-readable medium of claim 25, wherein the text passage to be triaged includes at least one of pages, characters, words, phrases, text-lines, sentences, paragraphs, columns of text, blocks of text, text articles, multi-page documents, collections of single-page documents and collections of multi-page documents.

31. The computer-readable medium of claim 25, wherein the OCR-output text passage triage decision includes at least one of sending the OCR-output text passage directly to an end user without post-OCR processing, sending the OCR-output text passage through a post-OCR inspection and processing stage, and sending the original text passage image to be keyed in manually.

* * * * *